Jan. 10, 1956 G. N. PHILLIPS 2,730,410
CUTOFF CONTROLS FOR AUTOMOBILE HYDRAULIC BRAKES
Filed Aug. 18, 1952 2 Sheets-Sheet 2

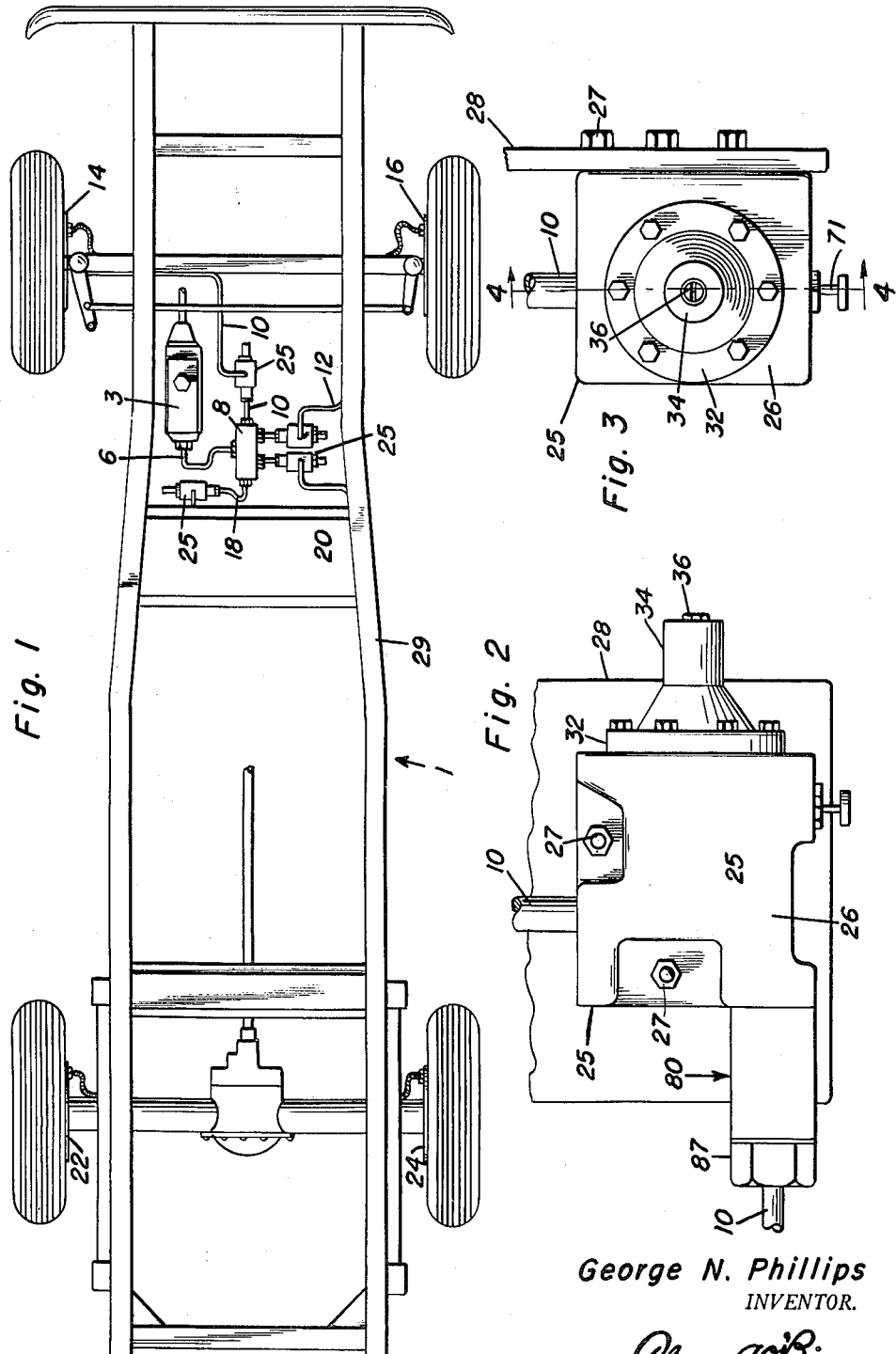

George N. Phillips
INVENTOR.

BY Clarence A. O'Brien
and Harvey B. Jacobson
Attorneys diaphragm backing plate 32 opposed to said recess 31 and having a similar recess 33 in its opposed inner side mating with the recess 31. The plate 32 is formed with a central boss 34 on the outer side thereof extending longitudinally of the body 26 and which is provided with a longitudinal bore 35 closed at its outer end by a screw plug 36 and serving a purpose presently clear. Bolts 37 secure the plate 32 to said body 26.

United States Patent Office 2,730,410
Patented Jan. 10, 1956

2,730,410

CUTOFF CONTROLS FOR AUTOMOBILE HYDRAULIC BRAKES

George N. Phillips, El Dorado, Ark.

Application August 18, 1952, Serial No. 305,003

4 Claims. (Cl. 303—84)

My invention relates to improvements in cutoff controls for the brake lines of hydraulic brakes of automobiles.

The primary object of my invention is to provide a cutoff control connected in each brake line between the master pressure displacement cylinder and the wheel brake cylinder which will close the line between the pressure displacement cylinder and the wheel brake cylinder if the line of the associated wheel brake cylinder leaks and which is operated to hold the line open by a pressure responsive diaphragm rendering the control highly sensitive and efficient and preventing pressure leaks in the control.

Another object is to provide a control for the above purposes which is simple in construction, inexpensive to manufacture and install and which will not be adversely affected, by jolting of the automobile over rough roads, in a manner impairing its efficiency.

Other and subordinate objects, within the purview of my invention, together with the precise nature of my improvements will be readily understood when the succeeding description and claims are read with reference to the drawings accompanying and forming part of this specification.

In said drawings:

Figure 1 is a plan view of an automobile chassis illustrating the manner in which my improved control is connected in each brake line of the hydraulic brakes;

Figure 2 is an enlarged fragmentary view in side elevation of the control and its mounting bracket;

Figure 3 is a view in end elevation;

Figure 4:
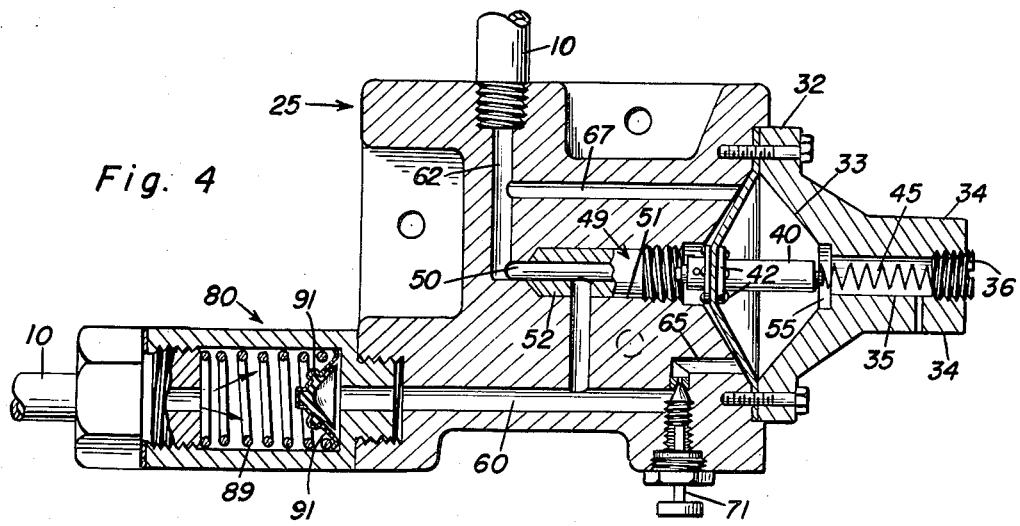
Figure 4 is a further enlarged view in vertical longitudinal section taken on the line 4—4 of Figure 3 and illustrating the main control valve closed.

Referring to the drawings by numerals and wherein my improved control has been illustrated as forming part of the otherwise conventional hydraulic brake equipment of an automobile, the chassis 1 of which has been illustrated as sufficient for the present purposes. Preferably the master pressure displacement cylinder 3, operated by the usual brake pedal, not shown, has its discharge line, forming part of each brake line, connected to a pressure distributing cylinder 8 from which the brake lines 10, 12 extend to the front wheel brakes 14, 16, and similar lines 18, 20 to the rear wheel brakes 22, 24, the brakes including the usual wheel brake cylinders, not being shown. One of my improved controls, as shown diagrammatically in Figure 1, is interposed in each brake line 10, 12, 18, 20, the controls designated generally, in each instance, by the numeral 25 since the same are identical. The control 25 comprises a rectangular body 26, of any suitable material, bolted, as at 27, to a hanger bracket plate 28 which may be connected in any suitable manner, not shown, to the frame 29 of the chassis 1. At one end of the body 26, constituting the rear end, a circular diaphragm chamber 30 is provided comprising a flat bottom concave recess 31 in said body 26, and a circular diaphragm backing plate 32 opposed to said recess 31 and having a similar recess 33 in its opposed inner side mating with the recess 31. The plate 32 is formed with a central boss 34 on the outer side thereof extending longitudinally of the body 26 and which is provided with a longitudinal bore 35 closed at its outer end by a screw plug 36 and serving a purpose presently clear. Bolts 37 secure the plate 32 to said body 26.

An annular rubber diaphragm 38 in the chamber 30 is clamped at its outer edge to the body 26 by said plate 32 and the bolts 37 to flex laterally, forwardly and rearwardly.

A cylindrical plunger 40 extends through the center of the diaphragm 38 and is fixed thereto by set collars 41, 42 thereon between which the diaphragm 38 is secured by rivets 43. The plunger 40 is guided in the bore 35. A coil spring 45 in the bore 35 between the plunger 40 and the screw plug 36 normally advances the plunger 40 forwardly of the body 26 to flex the diaphragm 38 forwardly into flat seating engagement with one side of the chamber 30 formed by the bottom of the recess 31. The diaphragm 38 is flexed rearwardly by fluid pressure, introduced into the chamber by means presently described, and to retract the plunger 40 and seat the diaphragm 38 flat against the side of the chamber 30 formed by the bottom of the recess 33.

The plunger 40 forms part of a spring loaded diaphragm operated, main pressure control valve 49 the remainder of which comprises a forwardly and extending, coaxial valve stem 50 on the plunger 40 advanced and retracted by said plunger in a longitudinal sleeve 51 in said body to close and open a bottom port 49 in said sleeve. The valve stem 50 has a working fit in the sleeve 51 and the sleeve 51 it fitted in a longitudinal bore 52 in said body 26 and removably secured in said bore by threading one end, as at 53, into the rear end of said bore. The bore 52 is provided with an enlarged front end 54 accommodating the collar 41 when the diaphragm 38 seats flat against the side of the chamber 30 formed by the recess 31. The bottom of the recess 33 is formed with a countersink 55 for seating the collar 32 so that the diaphragm 38 may seat flat against the other side of the chamber 30 formed by the bottom of the recess 33.

A longitudinal bottom pressure inlet duct 60 extends partway into the body 26 from the end of said body opposite the front end with a right angled branch duct 61 communicating with the port 49 in the sleeve 51 to be closed and opened therewith by advance and retraction of the valve stem 50. A right angled pressure discharge duct 62 in said body 26 communicates with the sleeve 51 and extends upwardly in said body into communication with the associated brake line, for instance brake line 10, which is tapped in the top of the body 26. The pressure inlet duct 60 terminates between the branch duct 61 and the chamber 30 in a right angled discharge section 65 communicating with the chamber 30 in front of the diaphragm 38. A pressure relief duct 67 extends horizontally in the body 26 from the front part of the diaphragm chamber 30 and communicates with the pressure discharge port 62. As will be seen, the inlet duct 60, branch duct 61, port 49, sleeve 51 and discharge port 62 forms a passage through the body 26 with the brake line 10 connecting one end thereof with the pressure displacement cylinder and said brake line 10 connecting the other end thereof with the wheel brake cylinder.

Valve means is provided for opening and closing the section 65 of the pressure inlet duct 60 comprising a valve seat 70 in said section for an upwardly closing needle valve 71 threaded upwardly through the bottom of the body 26 and extending through a packing gland 72 threaded into said bottom.

An auxiliary pressure inlet and back pressure control valve 80 is attached to the body 26 and forms part of the line connecting the pressure inlet duct 60 with the pressure displacement cylinder 3. The valve 80 comprises a cylindrical casing 81 with a reduced neck 83 at one end threaded into the body 26 in communication with the rear end of said duct 60, which is to say the end of the passage opposite the end thereof connected to the brake cylinder, said end of the casing 81 forming a valve seat 84 in said casing 81. An axially ported screw plug 85 closes the other end of the casing 81 and with the port 86 thereof opening into said casing. A suitable coupling 87 connects the brake line 10 to the plug 85. A rigid cup valve member 88 in the casing 81 loaded by a spring 89 normally seats against the seat 84. An internal, flexible, cup valve member 90 is suitably mounted in the member 88 for flexing away from said member 88 to open ports 91 in the member 88 under pressure in the line 10 from the pressure displacement cylinder 3, said member 90 flexing toward said member 88 to close said ports 91 under back pressure from the brake cylinder of a predetermined value.

Figure 5:
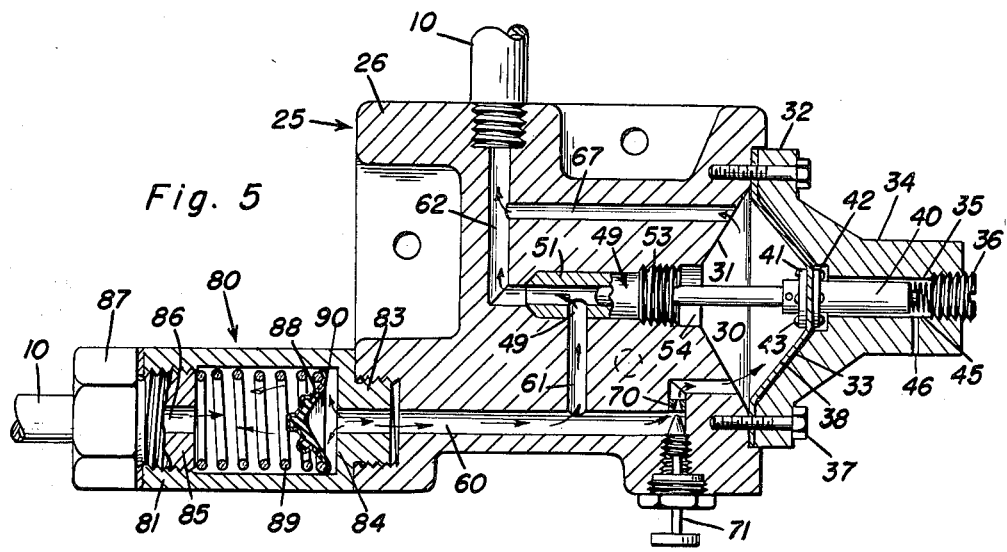
Figure 5 is a view in vertical longitudinal section illustrating the main control valve open.

Referring now to the operation of my improved control, normally the main pressure control valve 49 is closed by the spring 35 advancing the plunger 40 and stem 50. The auxiliary pressure inlet and back pressure control valve 80 is normally closed by the spring 89 seating the valve member 90 and flexing of the valve member 90 to close the ports 91. The main pressure control valve 49 in closing closes the branch duct 61 from the discharge duct 62 and the diaphragm 38 in closing said valve 49 seats flat against the side of the chamber 30 from which the pressure relief duct 67 extends and thereby closes said duct 67. To condition the control for operation, the valve 71 is turned to open the valve seat 70. Pressure is then displaced at the pressure displacement cylinder 3 to enter the valve casing 81. The incoming pressure in casing 81 flexes cup valve member 90 to open ports 91 and admit pressure into the pressure inlet duct 60 to pass into said chamber 30 flex diaphragm 38 against the rear side 33 of chamber 30 and open the main control valve 49, also pressure relief duct 61, as shown in Figure 5, so that the pressure may pass from duct 60 to discharge duct 62 and the wheel brake cylinder by way of the branch duct 61, port 49 and sleeve 51, and by way of chamber 30 and pressure relief duct 67, all as shown by the arrows in Figure 5. When the brake pedal is hard, after the wheel brake cylinder has been bled, the valve 71 is turned to closing position. Now, the normal braking pressure in the brake line 10 will, through back pressure in the chamber 30 hold diaphragm 38 against the rear side of chamber 30 and thus hold the main pressure control valve 49 open in opposition to the spring 45 which is constructed for compression under fluid pressure against said diaphragm 38 of approximately six to eight pounds, which pressure value usually obtains normally in the brake line. When the pressure at the pressure displacement cylinder is relieved, by release of the brake pedal, the normal pressure in the brake line results in back pressure against the valve members 88 and 90 and opposing spring 89 so that the cup valve member 90 is flexed to close the ports 91 and the valve member 88 is unseated in opposition to the spring 89 for return of pressure through the valve 80 back to the pressure displacement cylinder 3, it being understood that the spring 89 is constructed for compression by back pressure in said brake line 10. However, the spring 89 is constructed to seat valve 88 so as to maintain a back pressure in the brake line 10 sufficient to overcome spring 45 and maintain the diaphragm 38 against the rear side 33 of the chamber 30, as shown in Figure 5. The brake shoe release springs, not shown, will be strong enough to move the brake into release position against the loaded valve 88. If the wheel brake cylinder leaks, or the brake line 10 connecting the discharge duct to said cylinder, pressure in the diaphragm chamber 30 is relieved through the pressure relief duct 67 so that the spring 45 will advance plunger 40 to close the main pressure control valve 49, and such advance of the plunger 40 flexes the diaphragm 38 in the manner previously described to close the pressure relief duct 67 at said chamber 30. As will be seen, the diaphragm 38 forms a sealing member in the chamber preventing pressure leaks out of the bore 35 along the plunger 40 and between the rear end of the body 26 and the plate 32.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a pressure cutoff control, a body having a through passage therein with ends adapted to be connected by a hydraulic brake line to a pressure displacement and a brake cylinder of a hydraulic brake for passing pressure from said displacement to a brake cylinder, a main control valve in said body operative to open and close communication between the ends of said passage, a chamber in said body having a flexible diaphragm therein connected to said main valve and flexible under pressure in said chamber to open said main valve, valve controlled means in said body for admitting pressure from the end of said through passage connected to said displacement to said chamber to flex the diaphragm and open said control valve, a passage in said body connecting the end of said through passage connected to said brake cylinder and chamber to equalize pressure in the chamber with that in the last mentioned end of said through passage, spring means in said body for closing said main valve when the pressure in said last mentioned end of the through passage falls below a given value, and means on said body and at that end of the through passage which is adapted to be connected to a displacement cylinder for passing fluid under pressure into said through passage and operative to retain fluid under pressure in said through passage at a value sufficient to maintain the diaphragm and spring means in their control valve opening position.

2. A cutoff control according to claim 1, said spring means comprising a plunger on one side of the diaphragm, and a spring loading said plunger.

3. A cutoff control according to claim 1, said main valve comprising a sleeve on said body having a port therein in said first named passage, and a valve stem slidable in said sleeve to open and close said port.

4. A cutoff valve according to claim 1, said last means comprising an auxiliary pressure responsive spring loaded valve.

References Cited in the file of this patent

UNITED STATES PATENTS

| | | |
|---|---|---|
| 2,121,653 | Davis | June 21, 1938 |
| 2,149,295 | Jobson | Mar. 7, 1939 |
| 2,201,523 | Derrig | May 21, 1940 |
| 2,292,925 | Bourgeois | Aug. 11, 1942 |